(12) United States Patent  (10) Patent No.: US 8,164,813 B1
Gat et al.  (45) Date of Patent: Apr. 24, 2012

(54) NON-CIRCULAR CONTINUOUS VARIABLE APERTURE OR SHUTTER FOR INFRARED CAMERAS

(75) Inventors: Nahum Gat, Manhattan Beach, CA (US); Jingyi Zhang, Torrance, CA (US)

(73) Assignee: Opto-Knowledge Systems, Inc., Torrance, CA (US)

( * ) Notice: Subject to any disclaimer, the term of this patent is extended or adjusted under 35 U.S.C. 154(b) by 995 days.

(21) Appl. No.: 12/006,428

(22) Filed: Dec. 31, 2007

Related U.S. Application Data

(60) Provisional application No. 60/934,869, filed on Jun. 16, 2007.

(51) Int. Cl.
 *G02B 26/08* (2006.01)
(52) U.S. Cl. .................. 359/230; 359/233; 396/510
(58) Field of Classification Search .......... 359/227, 359/236; 396/452–510
 See application file for complete search history.

(56) References Cited

U.S. PATENT DOCUMENTS

| 24,356 | A | | 6/1859 | Miller |
|---|---|---|---|---|
| 582,219 | A | | 5/1897 | Mosher |
| 3,082,674 | A | * | 3/1963 | Bagby .................. 396/257 |
| 3,596,096 | A | | 7/1971 | Koehler |
| 4,583,814 | A | | 4/1986 | Koetser |
| 4,783,593 | A | | 11/1988 | Noble |
| 4,797,700 | A | * | 1/1989 | Tsuji et al. .................. 396/508 |
| 4,904,055 | A | * | 2/1990 | Bridges .................. 359/233 |
| 5,371,369 | A | | 12/1994 | Kent |
| 5,737,119 | A | | 4/1998 | Mladjan et al. |
| 5,966,945 | A | | 10/1999 | Mengel et al. |
| 6,122,919 | A | | 9/2000 | Patel et al. |
| 6,133,569 | A | | 10/2000 | Shoda et al. |
| 6,174,061 | B1 | | 1/2001 | Cooper |
| 6,249,374 | B1 | | 6/2001 | Chipper |
| 6,414,708 | B1 | | 7/2002 | Carmeli et al. |
| 6,661,498 | B1 | * | 12/2003 | Hirukawa .................. 355/71 |
| 6,707,044 | B2 | | 3/2004 | Lannestedt et al. |
| 6,806,471 | B2 | | 10/2004 | Matsukuma et al. |
| 7,157,706 | B2 | | 1/2007 | Gat et al. |
| 7,427,758 | B2 | | 9/2008 | Garman et al. |
| 2003/0086164 | A1 | | 5/2003 | Abe |
| 2003/0161049 | A1 | | 8/2003 | Okada et al. |
| 2004/0129881 | A1 | | 7/2004 | Hamrelius et al. |

FOREIGN PATENT DOCUMENTS

JP  05172635  7/1993

OTHER PUBLICATIONS

Duncan, W.D., et al., A millimeter/Submillimeter Common User Photometer for the James Clerk Maxwell Telescope, Monthly Notices of the Royal Astronomical Society (1990), 243, pp. 126-132.
Gom, B.G., A Cryogenic Detector for Submillimeter Astronomy, Master of Science Thesis, University of Lethbridge, Mar. 1999, Alberta, Canada, Chapter 3, pp. 25-29.

* cited by examiner

*Primary Examiner* — James Phan
(74) *Attorney, Agent, or Firm* — Perkins Coie LLP

(57) ABSTRACT

A continuous variable non-circular aperture for an infra-red camera is formed by a plurality of positionable metal blades arranged to define there between an aperture of non-circular shape. A rotatable actuator plate positions the blades. Actuator rotation in one direction moves the metal blades to increase the size of the non-circular aperture without changing the non-circular shape of the aperture and vice-versa when the actuator plate is rotated in the opposite direction also maintaining the non-circular aperture shape. A preferred non-circular shape for a continuous variable aperture now possible is a rectangle; another is configured as a racetrack.

17 Claims, 6 Drawing Sheets

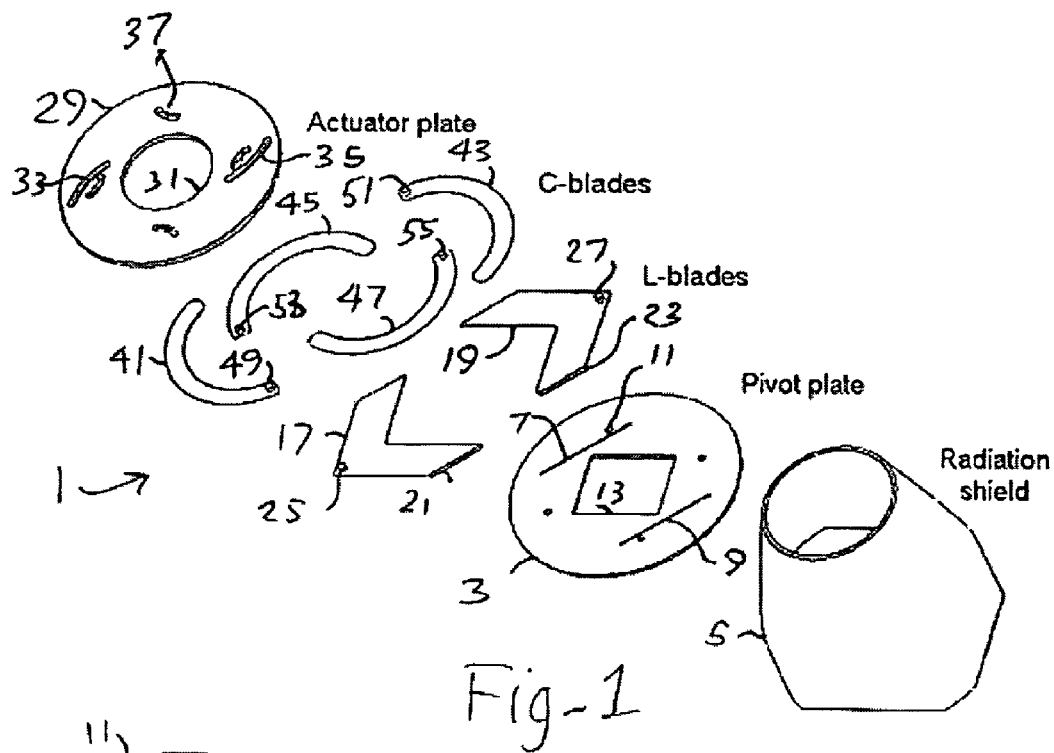
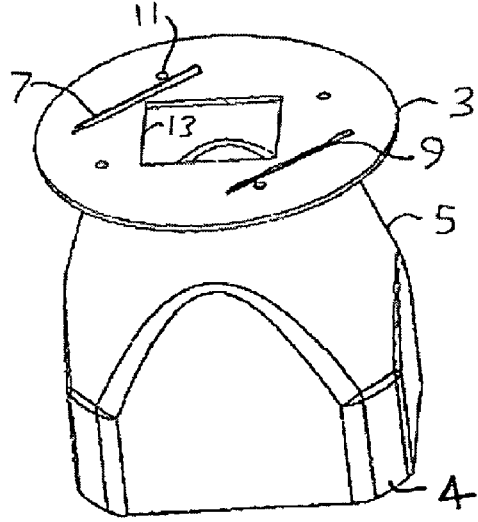
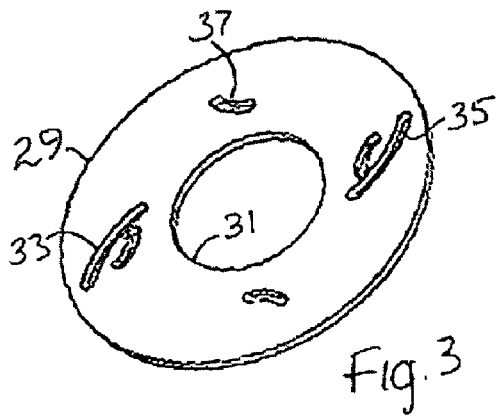
Fig.-1
Fig.2
Fig.3

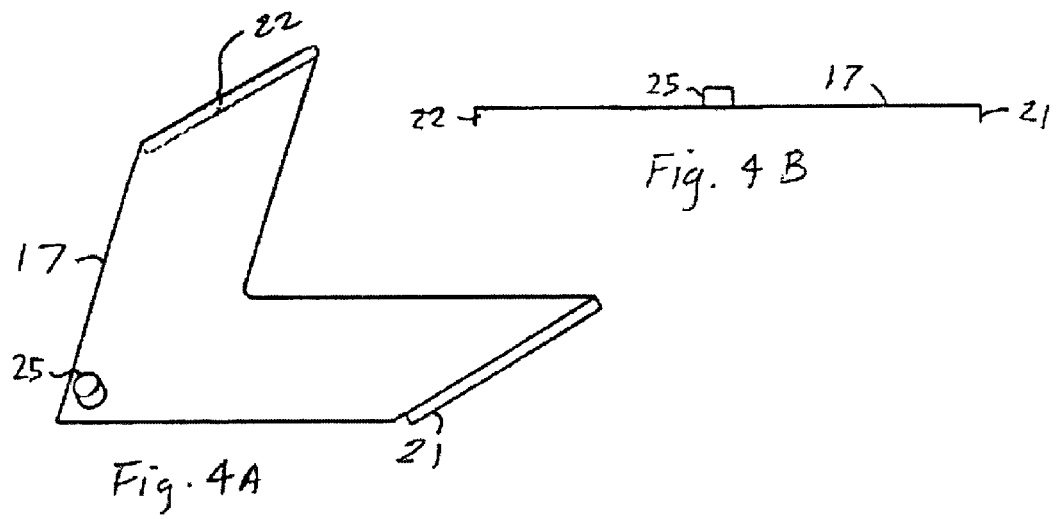
Fig. 4A
Fig. 4B
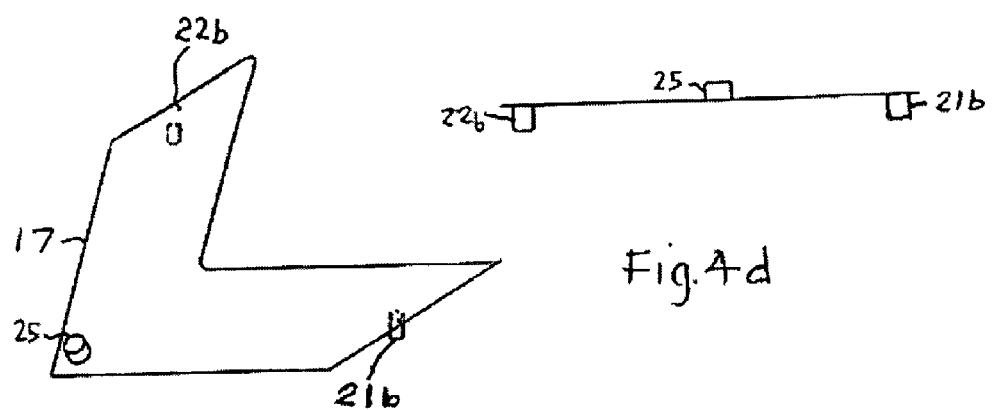
Fig. 4c
Fig. 4d
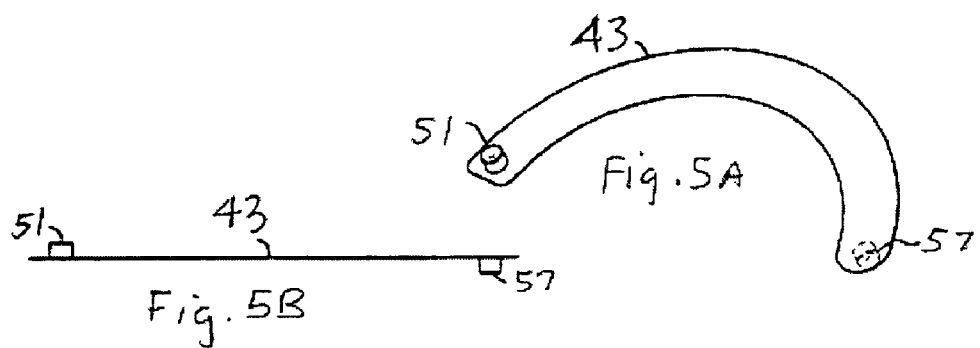
Fig. 5A
Fig. 5B

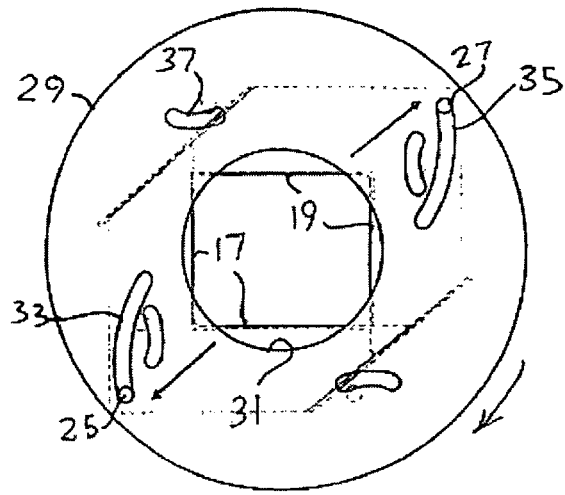
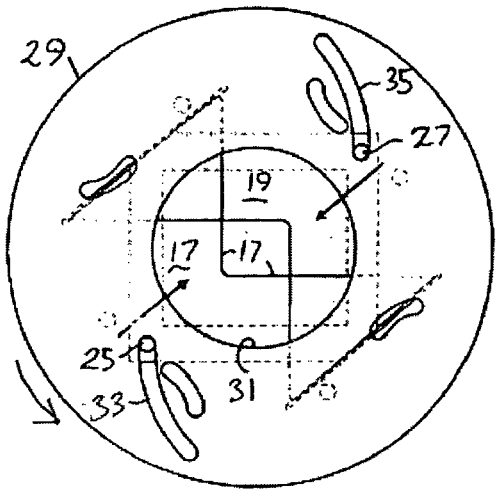
Fig. 6A  Fig. 6B
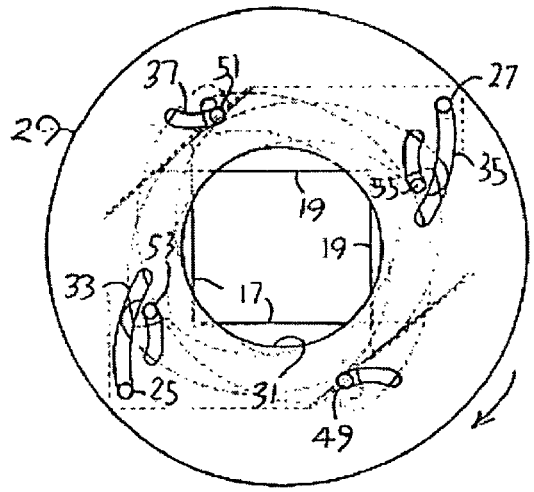
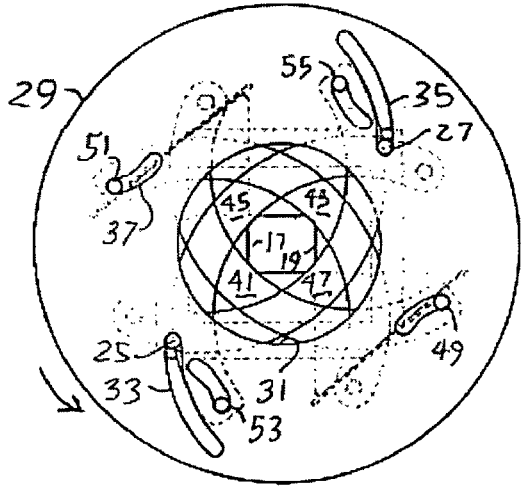
Fig. 7A  Fig. 7B

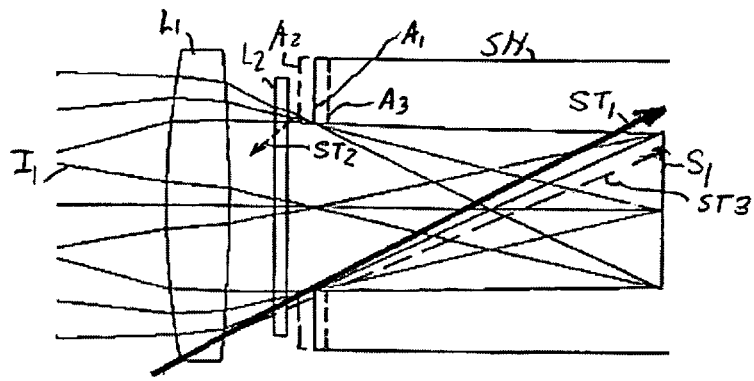
Fig. 11
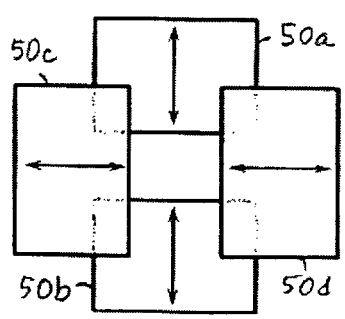
Fig. 12
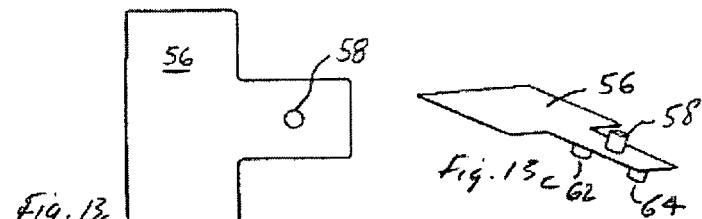
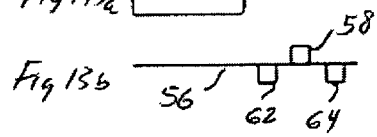
Fig. 13a
Fig. 13b
Fig. 13c
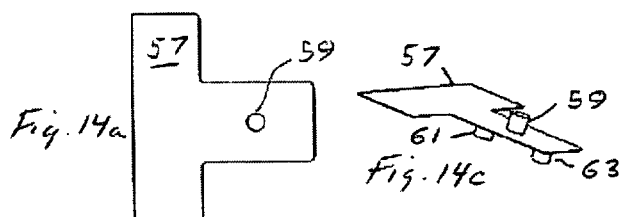
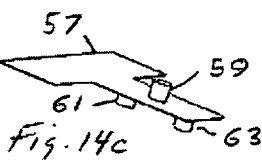
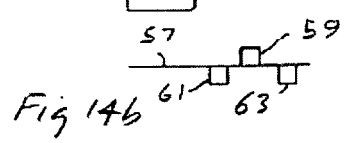
Fig. 14a
Fig. 14b
Fig. 14c

NON-CIRCULAR CONTINUOUS VARIABLE APERTURE OR SHUTTER FOR INFRARED CAMERAS

REFERENCE TO RELATED APPLICATIONS

This non-provisional application for patent is related to an earlier-filed provisional application for patent by the inventor, Ser. No. 60/934,869, filed Jun. 16, 2007, entitled Non-Circular Continuous Variable Aperture for Forward Looking Infrared Cameras, the entire content of which is incorporated herein by reference in its entirety. Applicant claims the benefit under 35 U.S.C. 119(e) based on the foregoing provisional application.

REFERENCE TO OTHER PATENTS & APPLICATIONS

This application also makes reference to the following patents or published applications: U.S. Pat. No. 7,157,706, granted Jan. 2, 2007 to N. Gat, and application Ser. No. 11/273,919, filed Nov. 14, 2005, published Nov. 16, 2006 as Application no. US-2006-0255275-A1 to Garman et al

FIELD OF THE INVENTION

This invention relates to infrared cameras of the type that contain either a continuous variable aperture or cold stop effective at multiple discrete f-number aperture stop positions and, more particularly, to infrared cameras in which the aperture stop or exit pupil formed by the foreoptics of the camera is of a non-circular, preferably square shape, and both the effective f-number of the foreoptics and the camera's cold stop changes with changes in the size of that non-circular area. Such cameras are sometimes referred to as forward looking infrared ("FLIR") systems.

BACKGROUND

Infrared cameras operating in the thermal infrared portion of the electromagnetic spectrum present images of scenes in which the image is formed by the optical system mounted in front of the camera, the foreoptics. Such infrared cameras incorporate cold detectors that are sensitive to thermal radiation. As is known all objects emit infrared radiation in proportion to their temperature in accordance with the Planck blackbody function. Thus parts of the camera or the foreoptics can be a source of unwanted infrared radiation if protective measures are not undertaken. To prevent the cold detector in the infrared camera from receiving unwanted radiation from the camera structure, the detector is typically surrounded inside a structure, termed the "radiation shield," that is at a very cold in temperature. In turn, the radiation shield is enclosed inside a vacuum chamber. The vacuum chamber contains a window, impervious to ambient air, which transmits exterior infrared radiation received at the window. The infrared radiation from the scene collected by the optics passes through the vacuum window, and through an aperture in the radiation shield, and is then focused at the cold detector.

The aperture in the radiation shield is located at the exit pupil of the front optical system or foreoptics. That aperture is sized so that it admits infrared radiation propagating from the foreoptics only, and blocks radiation from the surrounding structure, including the mechanical structure of the camera supporting the optics, and the vacuum chamber walls. This aperture is referred to as a stop, and more specifically, as a cold stop, because (i) the aperture admits the desired infrared radiation, but stops all undesired radiation, and (ii) the aperture is cold so that the structure around the stop does not contribute to the undesired radiation.

Normally, the f-number of the optics is matched to the cold stop f-number. If there is a change in the optics that results in a different field of view, then the f-stop number of the optics is changed and cold stop f-number must also be changed to match. In modern infrared systems, the optics of the camera is capable of changing the observed field of view. As a result, when the field of view is changed, the f-number of the optics may change. When the f-number of the optics changes, the aperture in the cold stop no longer matches the exit pupil size of the optics. The cold stop aperture may then be too large or too small. If it is too small, the aperture blocks some of the desired radiation from entering the detector, causing vignetting. If the aperture is too large, it admits too much of the unwanted radiation, which degrades the image.

A solution to such problems previously invented by some inventors of the present invention has been to use a continuous variable size aperture in the radiation shield and to effectively match the size of that aperture to the f-number of the front optics. In this discussion the terms aperture stop and exit pupil refer to the same physical position in the system optical train. In prior work, circular variable aperture cold stops were developed and matched to the virtual aperture size or f-stop defined by the front optics or lens as that which obtains the clearest image and that is the position where the rays of light that pass through the lens effectively collect and define an aperture (see U.S. Pat. No. 7,157,706 to N. Gat (the "'706 patent"), and Ser. No. 11/273,919, filed Nov. 14, 2005, currently published U.S. Application no. 20060255275 to Garman et al. both of which are assigned to the assignee of the present invention).

In some modern infrared systems, the exit pupil of the front optics is found to be of a non-circular area or geometry, such as the shape of a rectangle, a square, or a racetrack (a rectangle with rounded corners), because of limited optical aperture size that can be supported by the vehicle on which the FLIR system is mounted. The existence of those non-circular exit pupils evidences a need for a corresponding non-circular variable aperture cold stops if the infrared camera is to permit matching the size of the aperture in the radiation shield with the f-number of the front optics as in the prior invention in the '706 patent in those infra red cameras with foreoptics that form a non-circular exit pupil.

The variable aperture or iris of a camera is typically created by the use of multiple thin blades that are pivoted at one end, while the other end is rotated by an actuator. The actuator contains slots in which a pin that is attached to the blade, the actuator pin, is received and dragged about by the actuator. The actuator motion causes the blades to pivot and form the aperture into a larger or smaller size circle, depending on the direction of rotation of the actuator. The diameter of that circular aperture depends on the degree of actuator rotation with the largest aperture formed at the maximum rotational position in one direction and the smallest aperture formed at the maximum rotational position in the opposite direction. Such circular iris mechanisms are well known in the photography world. Those circular iris mechanisms are also seen to be continuous. That is, the geometry or shape of the aperture remains unchanged even though the aperture increases (or decreases) in size with the degree of rotation of the actuator. Some photographic lenses contain only a few blades (say 5 or 6, as example) in the iris mechanism. As a result the shape of the aperture may be an imperfect circle, such as a pentagon or a hexagon or other convex polygon with equal length sides. With greater number of blades in the iris, and with slightly curves edges to the blades, the circular symmetry of the aperture improves, forming heptagon, octagon, etc., with more rounded corners. Such mechanisms, however, are not amenable to produce continuous variable rectangular, square or racetrack shaped apertures.

Circular or nearly circular variable apertures are well known in prior art. Apertures that produce discrete non-circular openings in infra red camera systems have also been produced in the past. For example in the fully open position, the blades that form the aperture retract out of the way, revealing an underlying (or overlying) square or rectangular opening defined by an opening in the radiation shield or some other fixed structure. As the blades are rotated inwardly, that is, rotated clockwise or counter-clockwise in dependence on the particular mechanical design chosen for the mechanism, the blades produce a smaller size non-circular aperture. The problem with the foregoing apertures that produce non-circular openings is that they provide limited discrete aperture sizes, typically limited to two aperture sizes in the requisite geometry or shape, but are not continuous. Were the foregoing blades permitted to also remain open at locations in between the two positions of full open aperture or fully closed-down aperture, one would find that the geometry or shape of the aperture at those in-between positions are no longer the same as the shape at the full open and full closed position, but is different, and changes even further as one continues to advance the rotation of the actuator. Because the shapes assumed by the aperture in the in-between positions varies widely and differs from the desired shape that matches the aperture shape defined by the optics, the foregoing designs for the non-circular apertures are unacceptable. Such changes of aperture shape in the foregoing context are regarded as discontinuous. The object of the present invention is to provide a continuous variable aperture that may be adjusted to any desired size of a defined aperture shape between and including the largest and smallest opening desired in the optics of the camera. Moreover, in a special case the smallest size of the aperture may be set to completely block the incoming radiation, serving as a cold shutter for the camera to permit use in camera calibration and also for blocking undesired intense radiation that could potentially blind or even damage the infra-red sensor of the camera.

BRIEF SUMMARY OF THE INVENTION

In accordance with the invention a non-circular adjustable continuous aperture for an infra-red camera is formed using two L-shaped blades in a confronting overlapping relationship. When facing one another, the two blades form there between a rectangular aperture, more specifically, a square aperture. By shifting the blades in equal amounts along the diagonal of the rectangle or square either away from one another or closer together, the size of the formed rectangular (or square) aperture, respectively, increases or decreases, and the aspect ratio of the sides of the rectangle or square is maintained. Further, the position of the center of the aperture is fixed in position relative to other elements, such as a lens, with which the aperture is used. In another embodiment of the adjustable continuous non-circular aperture, the corners of the formed rectangular or square aperture are rounded to form a racetrack shaped aperture, for which an additional set of four C-shaped blades are incorporated in the aforedescribed structure. These C-blades are pivoted at one end and have an actuator pin at the other end that travels in a curved slot in an actuator, the latter element being a rotatable plate that directly and concurrently controls positioning of both L-blades and C-blades. By rotating the actuator in one direction the L-blades change the size of the aperture, while the properly placed C-blades that cover the corners of the square or rectangular opening to form the racetrack shape move closer to the center, imparting a rounded shape to those corners. Since the L-blades can be made with a rounded corner in the corner formed by the two legs of the L, it may be possible in still other embodiments to use only 2 C-blades to round the remaining two corners between the two L-blades. In an alternative embodiment a continuous non-circular aperture is constructed using four T-shaped blades, arranged in two pairs in which the two pairs are oriented for movement in directions along a route ninety degrees from one another and in which spacing between the blades in each pair is synchronized so that the spacing in both pairs concurrently widens or narrows, even to the extent of closing, concurrently with rotation of the actuator. The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

BRIEF DESCRIPTION OF DRAWINGS

In the Drawings:

FIG. 1 shows an exploded view of all the principal parts of the non-circular aperture assembly for an infrared camera;

FIG. 2 shows a typical radiation shield with the pivot plate attached at the aperture stop position;

FIG. 3 shows details of the actuator plate used in the assembly of FIG. 1 containing the slots that are designed to move the pins in the blades;

FIG. 4A is an isometric view of a flat L-shape blade used in the assembly of FIG. 1 that contains a single attached pin, and with blade ends bent 90 degrees from the plane of the blade forming depending lips;

FIG. 4B shows the L-shaped blade of FIG. 4A in side view;

FIGS. 4C and 4D present another implementation in which pins are substituted the L-shaped blade to replace and serve the same function as the depending lips used in the embodiment of FIG. 4A;

FIG. 5A is an isometric view of a C-shaped blade used in the assembly of FIG. 1 containing pins at each end with one pin located on the upper side and the other on the lower side of the blade;

FIG. 5B shows the C-shaped blade of FIG. 5A in side view;

FIG. 6A shows a top view of the assembled pivot plate, L-blades and actuator plate as used in the embodiment of FIG. 1, with the actuator plate in one extreme position placing the L-blades in fully open position;

FIG. 6B shows the same top view as in FIG. 6A with the actuator plate rotated to a second opposite extreme position in which the L-blades were moved closer to one another to define a smaller square aperture;

FIG. 7A shows a top view of the assembled pivot plate, L-blades, C-blades and actuator plate as used in the embodiment of FIG. 1, with the actuator plate in one extreme position to place the C-blades and L-blades in fully open position;

FIG. 7B shows the top view as in FIG. 7A with the actuator plate rotated to the an opposite extreme position to place the C-blades and L-blades in relatively closed down position covering the corners of the rectangle formed by the L-blades;

FIG. 11 is a pictorial section diagram of an infra-red camera that illustrates the effect of variable aperture thickness on image quality;

FIG. 12 is a pictorial of another embodiment in which a rectangular aperture is formed between the straight edges of two pairs of selectively positioned blades;

FIGS. 13a through 13c illustrate the T-shaped blade used in still another embodiment of the invention in respective top, side and perspective views;

FIGS. 14a through 14c illustrate the T-shaped blade of another pair of blades of slightly different size that is used with the blades of FIG. 13a-13c to define a rectangular aperture for the embodiment;

DESCRIPTION OF THE PREFERRED EMBODIMENTS

Figure 8:
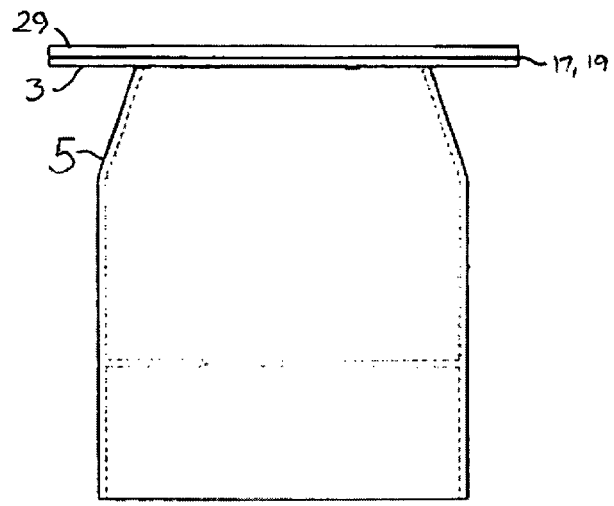
FIG. 8 shows a side view of the assembly with the radiation shield, the pivot plate on top of the radiation shield, the blades on top of the pivot plate, and the actuator plate on the very top of the assembly.

Reference is made to the exploded view of the aperture assembly 1 presented in FIG. 1. The assembly includes a pivot plate 3, also herein sometimes referred to as the base plate, mounted on top of the radiation shield 5, a hollow frusto-conical-like shaped metal member. The pivot plate contains two straight slots, 7 and 9, and four pivot holes 11, only one of which is numbered, and a central aperture 13. Those slots are cut or otherwise formed parallel to the diagonal, not illustrated, of the center square or rectangular aperture 13 in pivot plate 3. An actuator plate 29 contains a central circular shaped opening or passage 31 therethrough, a circular outer periphery that is concentric with passage 31, two long curved slots 33 and 35 located on diametrically opposite sides of passage 31 and is relatively thin and flat. Actuator 29 is to be mounted in a camera, not illustrated, with structure that permits the user, directly or indirectly, to rotate the actuator. In the assembled aperture, size adjustment of the aperture is accomplished by rotating the actuator a limited amount, either clockwise or counter-clockwise as appropriate. An enlarged view of the actuator plate is illustrated in FIG. 3, later herein discussed.

In one embodiment the rectangular aperture is formed between two L-shaped blades 17 and 19, referred to as L-blades. Those blades are seated on pivot plate 3. The relative positioning of the L-blades is controlled by actuator plate 29. In another embodiment in which a racetrack shape of aperture is desired, curved blades, referred to as C-blades, 41, 43, 45 and 47, are included overlying the two L-blades. Those C-blades are also mounted to a pivot point on pivot plate 3 and are controlled in position by the same actuator plate 29.

Continuing with FIG. 1, L-blades 17 and 19 are bent over along their side edges by 90 degrees to the plane of the blade surface to form narrow depending lips, one on each of the right and left hand sides illustrated. Only two of those lips 21 and 23 are visible in the figure, one lip on each of the two blades. The opposite edge of the respective blades also contains a bent-over portion or lip along the edge. A better view of one of the L-blades 17 is illustrated in FIGS. 4A and 4B, later more fully discussed.

The foregoing L-blades are very thin, typically 0.001" to 0.003" in thickness and are placed such that the depending lip thereof is inserted into respective ones of the straight slots 7 and 9 in the pivot plate when the blades are seated atop the pivot plate. The slots then guide and restrict the L-blades motion to movement along the surface of pivot plate 3 for the length of the respective slots. As assembled on top of the pivot plate with the depending lips fitted within the respective slots, when the two blades are moved in a direction away from one another to form the maximum aperture permitted, the maximum aperture permitted by the slots in the pivot plate. By design, the L-blades should still overlap slightly at that maximum spacing. That overlap assures that the blades will not bind or jam against one another when moved closer to one another to reduce the size of the formed central aperture. The width of the straight slots in the pivot plate is sufficient to accommodate the lips of each blade, since at least some portion of the lips will always overlap Because the lips on one L-blade must fit over the corresponding lips on the other L-blade, it may be noted that one L-blade will therefore be of a slightly larger size than the other L-blade.

The L-blades contain a single pin, 25 and 27, respectively, located on the top of blades 17 and 19, respectively. Those pins are aligned with respective ones of the longer curved slots 33 and 35 in actuator plate 29. The curved slots in the actuator plate are machined in a tangential inclination to the circular edge of central passage 31, so that when the L-blade pins, 25 and 27, are placed in the respective slots, 33 and 35, respectively, and the actuator 29 is rotated, the constrained L-blades are permitted to move only in a direction that is parallel to slots 7 and 9 in the pivot plate. This motion causes opening or closing of the formed square or rectangular shaped aperture defined in the space between the two blades.

Continuing with FIG. 1, the C-blades 41, 43, 45 and 47 are optionally included in the assembly if a racetrack shaped aperture is needed, an aperture that has a generally rectangular shape that possesses blunted or rounded corners. That is regarded as another embodiment. Those C-blades each contain an upwardly extending pin, sometimes referred to as an actuator pin, on the right end of the upper surface of the blade, actuator pins 49, 51, 53 and 55 respectively. A downwardly projecting pin, the pivot pin, not visible in this figure, is included on the opposite left end of the underside surface of each C-blade. One blade is illustrated in isometric view in FIG. 5A and in an edge view in FIG. 5B and shows the pin arrangement described with upwardly projecting actuator pin 51 and downwardly projecting pivot pin 57. One pin in each C-blade is anchored or seated inside one of the four small circular holes 11 in pivot plate 3. The other pin on the respective blade is placed in the short curved slot 37 in the actuator plate 29. When the actuator plate rotates, the top actuator pin captured in a slot 37 is dragged about by the rotation of the actuator plate and the C-blades are pivoted on their pivot pin about the circular hole in the pivot plate. The rotation forces the end of the C-blade to move along the curved slot in the actuator plate, so that the C-blade constantly covers the corner of the square or rectangular aperture formed by the L-blades 17 and 19.

Since the L-blade may be fabricated with a fixed geometry round corner between the two legs of the front edge of the L-shaped blade, the inner corner, it may only be necessary in a less preferred embodiment to use two C-blades to round the corners between the two L-blades. An advantage of using four C-blades, however, is that the four corners are maintained in the same geometry as the size of the aperture is being changed. The four C-blades also allow maintaining constant proportional length between the straight edge of the formed rectangle aperture and the rounded corner.

Referring to FIG. 2, the pivot plate 3 is shown mounted over the radiation shield 5. The orientation of the pivot plate is such that the square or rectangular opening 13 is parallel to the detector array, not illustrated, of the infrared camera that is positioned inside of the radiation shield 5. The pivot plate is attached to the radiation shield with a vacuum compatible bonding agent, such as certain types of available Epoxy. The plate can also be machined or formed as one part with the radiation shield to form an integral assembly.

Reference is again made to FIG. 3. Actuator plate 29 is shown containing the two long curved slots 33 and 35 that define the travel of the L-blades, and four short curved slots 37, only one of which is numbered, that define the travel of the optional C-blades. The curvature and length of the foregoing slots define the amount of rotation of the plate in order to open and close the variable aperture. The slots can be shaped for faster or slower transition between the fully open to the fully closed aperture positions. The center opening 31 in the actuator plate is circular and is of a diameter that corresponds to the largest aperture opening needed in the camera that possesses a racetrack shaped aperture. In other embodiments the central opening 31 in actuator plate 29 may be made of a square or rectangular shape that defines the largest aperture that is required for the camera. It may be noted that all elements of the aperture are preferably formed of a metal.

Reference is again made to FIGS. 4A and 4B. These two figures show a preferred embodiment of the L-blade 17, representative of the two blades of identical shape, but slightly different size. The blade contains lips 21 and 22, that are bent over portions of the flat upper surface and protrude in one direction from that surface. Those edges respectively fit into the straight slots 7 and 9 in pivot plate 3. An additional pin 25 on the opposite upper side of the blade protrudes from the blade surface in a direction opposite to that of edges 21 and 22, and is sized to fit within a slot in actuator plate 29.

In an alternate embodiment instead of bending the blade edges by 90 degrees to form the depending lip, two pins can be attached to the bottom side of the blade, one or two pins as desired on each of the right and left hand sides of the blade. The pins should fit in the respective slots in the pivot plate and serve to restrict and define the direction the blade may travel when moved, allowing these pins to travel along the straight line defined by the slots to the maximum extent permitted by design. In such an alternative embodiment the straight slot in the pivot plate may be formed somewhat wider, depending on the diameter selected for the pins. Such an L-shaped blade is illustrated in FIGS. 4C and 4D in an isometric and side view, respectively. For convenience, the elements that were earlier identified in FIGS. 4A and 4B carry the same identification number if present in these additional views. Referring to FIG. 4C, the blade includes a depending cylindrical pin 22*b* attached on the bottom left side of the blade in the figure and another depending cylindrical pin 21*b* is attached to the right underside of the blade. Referring to the side view of FIG. 4D, the blade contains depending pins 21*b* and 22*b*, and side edges that are straight. The depending pins serve the same function as the depending lips in the prior embodiment.

Instead of using a single pin on each of the two sides of the blade, one might chose to include two pins, spaced apart, on each of the foregoing sides of the blade. In yet another less preferred embodiment, only a single depending lip may be used formed on one side of the L-blade or only a single pin need be attached at the underside of the blade on either the right or left hand underside. Although within the scope of the invention, being a less reliable guide, the latter alternatives are less preferred.

FIGS. 5A and 5B show a preferred embodiment of the C-blade 43, representative of the four C-blades of identical shape. This blade is also made of a thin layer of metal. The blade contains two pins, 51 and 57; one pin attached at each end with one pin attached to one surface and the second pin attached to the opposite surface. The bottom pin 57 serves as a pivot point and is placed in a pivot hole 11 in the pivot plate 3 (See FIG. 1), The top pin 51 is placed in a short curved slot 37 in the actuator plate 29.

The end view of FIGS. 6A and 6B, to which reference is made, shows the two L-blades 17 and 19 located behind actuator plate 29 that is illustrated as a semi transparent surface. In FIG. 6A the L-blades are at their maximum spread, the extent of travel. The depending lips in those blades abut the remote end of the respective underlying slots in base plate 3, not illustrated in this figure. The pins 25 and 27 in the L-blades 17 and 19 are shown at the end of the long curved actuator plate slots, 33 and 35, respectively. When the actuator plate is rotated counter clock wise; in this case about 30 degrees as illustrated in FIG. 6B, the L-blades 17 and 19 are pushed in a direction toward one another to their closest, most overlapped position, making a small central aperture. In FIG. 6A the aperture is defined by the front edges of blades 17 and 19 and small portions of the circular edge of passage 31 and is the largest size aperture obtained. In this case the circular edge of central passage 31 in activator 29 effectively serves to round the corners of the formed rectangle without requiring use of the C-blades. However, the rounder corners are effectively formed in that way only at the extreme position. If the aperture was not permitted to open as wide as shown in FIG. 6A (or if the central passage 31 was increased in diameter) the aperture would be rectangular at all positions of rotation of the actuator. In FIG. 6B the aperture is defined inside passage 31 between the sides of blades 17 and 19 and in this embodiment is the smallest size aperture.

In other embodiments in which the L-blades are to serve as a shutter, the two blades will completely overlap and fully close the aperture, a minimum size essentially of zero. In the shutter embodiment, slots 33 and 35 in plate 29, for one, can be made longer, allowing the L-blades 17 and 19 to fully overlap in the closed position, closing the aperture and, thus, completely block the incoming light. That feature allows for use of the invention as a cold shutter for camera calibration purposes and for blocking undesired incoming radiation that could potentially blind or harm the camera.

The aspect ratio of the rectangles, the displayed width divided by the displayed height, is fixed, that is, remains constant, at all intermediate positions from the largest to the smallest aperture. At the smallest aperture, the L-blade pins 25 and 27 are shown positioned at the second end of the respective long curved slots 33 and 35. The lip portions of the L-blades, not visible here, travel along and are guided by the linear slots 7 and 9 (See FIG. 1) in the pivot plate 3, assuring that the L-blades are confined and may only travel along the defined direction. And because slots 7 and 9 were formed parallel to the diagonal of the rectangular aperture in the pivot plate 3 as earlier described, the route or movement of the L-blades is along that diagonal. As is evident from the symmetry and equal lengths of the slots that drive the movement of the L-shaped blades during actuator rotation, in this embodiment the two blades are moved in equal amounts. As a result the center of the aperture, the axis of the aperture, remains fixed in position relative to the axis of the other elements of the camera, such as the lens and image sensor. The shape of the L-blades and their placement relative to each other can form a square or a rectangular aperture.

In embodiments of the invention in which the formed aperture must be either square or rectangular the C-blades, earlier described, are not needed and may be omitted. In those embodiments only the L-blades are needed, such as was illustrated in FIGS. 6A and 6B and function with clockwise and counter-clockwise rotation of the actuator plate 29 as described while the pivot plate 3 remains fixed in position. The preferred embodiment includes the C-blades and the relationship between the actuator plate, the L-blades and the C-blades is illustrated in FIGS. 7A and 7B to which reference is next made.

As in FIG. 6, in FIGS. 7A and 7B the actuator plate 29 is shown in two positions, one (maximum available clockwise actuator rotation) that pulls the blades farther apart and creates the largest size racetrack aperture, and in a second position (maximum available counterclockwise actuator rotation), such as shown in FIG. 7B, rotated approximately 30 degrees, where the smallest racetrack aperture is obtained. In the full open position in FIG. 7A, the C-blades are positioned out of the way, forming a circle of larger diameter than passage 31. Hence the four rounded corners for the rectangular or square aperture that is formed by the L-blades is formed by the edge of circular passage 31. As the actuator plate is rotated counter-clockwise and the L-blades move closer together, the C-blades follow and maintain coverage, overlapping the corners of the formed rectangular aperture to produce a rounded or a chamfer corner shape as needed. This is shown in FIG. 7B where C-blades 41, 43, 45, and 47 are shown overlying the corner of the rectangular opening that is formed by the two L-blades 17 and 19. It is also noted that the fraction of the straight side of the aperture that is rounded by the C-blades remains constant and in proportion to the size of the aperture. As in the prior embodiment of FIGS. 6A and 6B, an alternative is to allow the C-blades to round the corners of the rectangular aperture, by either enlarging the diameter of the passage 31 or by limiting the clockwise rotation of actuator plate 29.

For completeness, FIG. 8 shows a side view of the assembly with the radiation shield, 5, the pivot plate, 3, the L-blades 17, 19, and C-blades covering the pivot plate, but not visible in the figure, and the actuator plate, 29, indicating the relative thickness of the plates and blades and the relative size with respect to the radiation shield. The blades are very thin, as thin as possible for reasons later herein described.

As those skilled in the art should recognize, the actuator plate for the aperture can be actuated by a number of techniques as described by Gat (U.S. Pat. No. 7,157,706) and Garman et al. (Published U.S. Application no. 20060255275). The aperture assembly of the invention may be installed in an infrared camera, and FLIR systems such as the cameras illustrated in the prior U.S. patent application to Garman et at Ser. No. 11/273,919, filed Nov. 14, 2005 and in the prior U.S. Pat. No. 7,157,706, showing the relationship of the radiation shield overlying the infrared detector, the adjustable aperture installed at the upper end of the radiation shield, and a vacuum housing with a vacuum window enclosing in vacuum the radiation shield, aperture and detector but permitting infrared energy to enter through the vacuum window, the exterior housing and foreoptics housing the entire assembly. In the foregoing camera various apparatus and techniques are described for varying the size of the aperture from the exterior of the vacuum housing, and are applicable to the present aperture apparatus. For additional details of the foregoing camera the reader may make reference to the cited patent and/or to the cited patent application, presently published. The non-circular aperture assembly of the present invention is readily adapted as a substitute, or a drop-in replacement, for the adjustable circular shaped apertures used in the foregoing infrared cameras.

Figure 9:
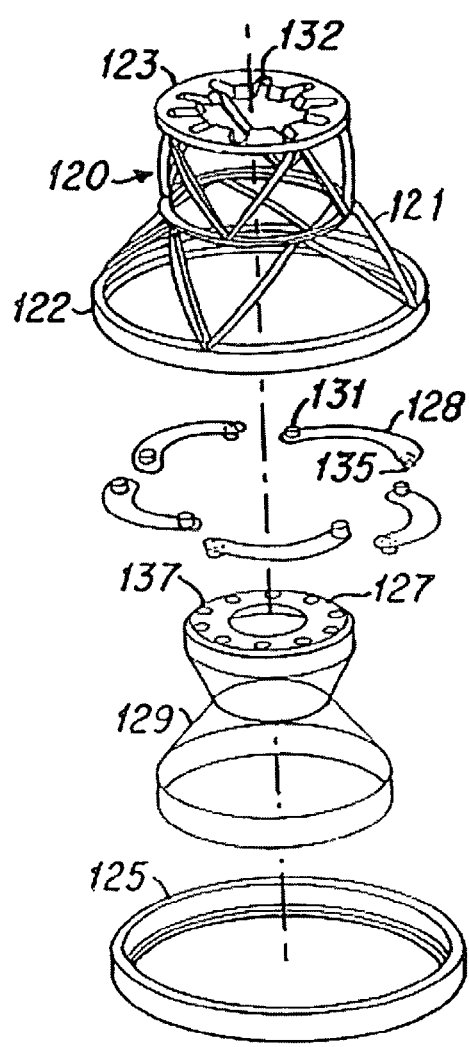
FIG. 9 is an exploded view of a circular variable aperture structure described in the pending prior application Ser. No. 11/273,919, publication US 2006-0255275A1, that uses a plurality of C-blades to form the aperture.

As example, FIG. 9 shows a continuous variable aperture cold stop illustrated and described in published U.S. Application no. 20060255275 to Garman et al assigned to the assignee of the present invention. For a complete description of the aperture assembly of FIG. 9, applicant refers to and incorporates herewithin the additional drawing figures containing additional views of the assembly and the text describing those figures and the assembly in the prior application Ser. No. 11/273,919, filed Nov. 14, 2005, currently published U.S. Application no. 20060255275 to Garman et al and assigned to the assignee of the present invention. In brief, the exploded view of the assembly in FIG. 9 includes an open truss or framework 120, sometimes referred to as an actuator. The truss being an assemblage of members (as beams) forming a rigid framework; and a framework is a skeletal, open work or structural frame. The truss is formed of stiff thin metal members 121 that extend between and form a unitary integrated structure with cylindrical ring 122 on the bottom end and a flat washer-like shaped ring 123 on the upper end, a driven ceramic ring 125, a radiation shield 129, a second upper ring 127 that forms the upper end of the radiation shield, and a number of blades 128. Rings 123 and 127 may sometimes be referred to as aperture rings. Upper ring 127 lies beneath blades 128. All of the foregoing rings are coaxial with one another.

The thin blades 128 underlie ring 123 and are sandwiched in partially overlapping relationship between ring 127 and ring 123. Blades 128 form the aperture for the infrared energy, much like the variable diaphragm aperture device or iris in a conventional 35 mm light camera lens. Five blades are shown, each of which is flat and narrow and curved in a shallow convex arc. Although space exists in the structure for ten blades, a preferred number, the complication of illustrating that number of blades would likely detract from the description. Hence, only five blades are illustrated in the figure.

Each blade 128 contains a pair of small cylindrical pivot pins 131 and 135, one located at each end. The first pivot pin 131 of the two is directed in one direction, upward. The second pivot pin 135 of the pair is located at an opposite end of the blade and is directed in the opposite direction, downward. Aperture ring 127, equivalent to the pivot plate 3 in FIG. 1, which is carried on a radiation shield 129, contains a series of ten cylindrical holes 137, each of which is designed to function as a socket to receive a respective one of the downwardly directed pivot pins 135 of a blade. Holes 137 are slightly larger in diameter than the associated pivot pin 135 to permit the pin to rotate in the hole with no friction or only minimal frictional resistance.

The pivot pin 135 of each blade in the series is inserted in a respective hole 137 in consecutive order, whereby the blades partially overlap. That assembly orients the upwardly directed pivot pins 131 of the blades to be evenly spaced on top of ring 127, spaced a distance sufficient to align with one of the slots 132 in aperture ring 123 of actuator 120. Aperture ring 123 (and the actuator 120) is lowered over the blades and radiation shield 129, and the slots in ring 123 are carefully slipped over the extending upper pins 131. The result of the rings and blade relationship is a variable aperture device. That is, by holding the radiation shield 129 and hence, ring 127, fixed and rotating ring 123 in one direction about its axis one end of blades 128 is pivoted outwardly to increase the diameter of the central aperture formed by the blades. Aperture ring 123, one should recognize, is equivalent to actuator plate 29 in FIG. 1. By rotating ring 123 in the opposite direction instead, the blade ends are pivoted radially inwardly, closing down that formed aperture. The overlapping blades 128 define a central circular shaped aperture coaxial with the principal axis of the aperture rings and the entire assembly.

To incorporate the new variable aperture in the assembly of FIG. 9, actuator plate 29 can replace actuator 123 and pivot plate 3 can replace the pivot plate 127, which the described blades are installed between the two plates. As modified, the arrangement of FIG. 9 as so modified may be placed inside the infra-red camera described in the foregoing published U.S. application.

Figure 10:
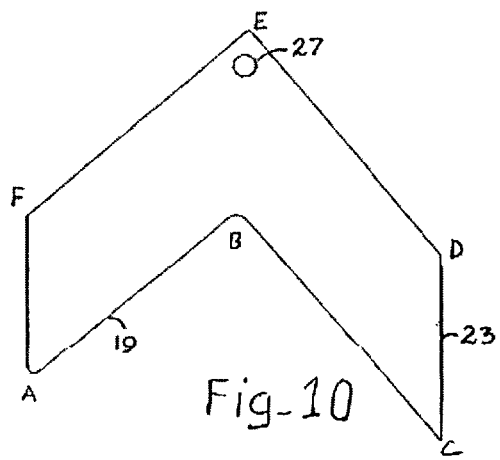
FIG. 10 shows one of the two L-shaped flat blades that together define a square aperture in a top plan view and is presented to assist the description of certain terminology presented in the claims.

Reference is made to FIG. 10, which shows blade 19 in the present embodiment in a top plan view. In order to ensure adequate antecedent for this element in the claims in various degrees of specificity, blade 19, which is representative of the two identical blades 19 and 17 in the new aperture, is described in greater detail than before. Blade 19 is seen to be a relatively thin flat metal aperture blade that is configured in a shape that is conveniently represented by the English upper case letter "L." Orienting side EF along a horizontal to the reader most easily shows that configuration. Rear sides of the blade, DE and EF, are essentially of the same length, with side DE having a slight length advantage. However the edges that form the front edge of the blade are of slightly different length. Straight edge CB is significantly greater in length than straight edge BA by about 20 percent. On the right and left, side CD is slightly greater in length than side FA and is more forward in extent. That places the depending lip that extends from D to C and ends on C on the right side in the figure in a lead position relative to the depending lip that extends from F to A and ends at A. The slots located in the pivot plate 3 are preferably of a length that permits both lips to concurrently abut the end of the respective slots at the maximum and/or minimum spread that is designed for the blades in the aperture assembly. Additional design possibilities are apparent. One may vary the length of the lip and the length of the slot to produce different effects. In general one may say that the proportional length of all the edges depends on the rectangular shape desired by the designer.

The front edge of the blade together with the like companion blade 17 as earlier illustrated and described was a principal element in defining a square shape to the aperture. Although the present application does not illustrate any other shapes that may be considered non-circular there are some that are called to mind, as example, parallelograms, tetragons, quadrangles, trapezoid, "kite" and rhombus. Although applicant does not see any present need for an aperture of any other non-circular shape, those additional shapes, the structure described herein can be modified to accommodate those shapes. The application teaches a methodology of attaining additional non-circular aperture shapes for those skilled in the art to follow to achieve apertures of such additional shapes, if given the need.

All components in this invention are fabricated from vacuum compatible materials. In the preferred embodiment, the blades are made of stainless steel. The pins used with those blades are also stainless steel. The actuator plate is formed from Titanium, a metal that possesses a low thermal conductivity that minimizes heat loading on the cold radiation shield and the cooler.

The continuous variable circular and non-circular apertures or cold stops, as variously termed, respectively shown in the prior application and in this application, respectively, are particularly advantageous in that a specific continuous aperture product can be used in infrared cameras with widely different optics. That is unlike the specific non-continuous two-position aperture product earlier briefly referenced, which cannot be so used. As example, infra red camera systems are found in military helicopters and in military vehicles. The optics in the camera installed in the helicopter provides two different fields of view (FOV), which may be selected by the pilot, say between an FOV of A and B. Likewise, the camera optics installed in the military vehicle are required to be selectively set in one of two different FOVs, say C and D, which are different than those in the helicopter.

The discontinuous type of cold stop aperture in the helicopter may be moved to match the f-stop of optics for A and B. But if the same cold stop aperture used in that camera is installed in the camera in the vehicle, the camera in the vehicle will obtain poor image quality. That is so because the optics in the camera in the latter may be set between C and D, but the cold stop can only be set between A and B, as earlier described. And that produces a mismatch. Thus, in the case of the prior discontinuous variable two position apertures, separate cold stop aperture mechanisms must be maintained in stock for separate cameras, and the mechanisms are not interchangeable. If there are five, six or more different camera systems the cost of production and spares is quite high because of the lack of interchangeability of the component. The continuous variable aperture is interchangeable. In the above example the mechanical shape, e.g., form, fit and function, of a given production model may be installed in one infra red camera to switch between A and B or between C and D, as desired. The stock keeping requirements for production or for spares is reduced in volume and the manufacturing cost for spares is considerably lowered. The greater the number of different models of cameras, as one sees, the greater is the savings due to the interchangeability of the "one size fits all" approach.

A continuously variable non-circular aperture within the meaning of this specification is one that possesses a defined non-circular shape or geometry, such as, as example, being of a quadrilateral shape, or more specifically, rectangular in shape, and even more specifically, square in shape. The term "generally rectangular" means that the shape need not be precisely rectangular, but could be rectangular with rounded corners like a racetrack, or oblong. The term rectangle is understood to include the specific kind of rectangle referred to as a square. That is, a rectangle is a parallelogram in which the four internal angles are right angles. A parallelogram is a quadrilateral in which opposite sides are parallel and equal. If all sides of a rectangle are equal, one has a square. As one appreciates from the figures, the particular rectangular aperture employed in the preferred embodiment of the invention is square. As one observes, a square (or a slightly modified square) is the preferred form of the continuously variable aperture of the invention. Being "variable" means that the aperture can be changed in area (i.e., size) in an infinite number of increments between a defined minimum area and a defined maximum area, either reducing the area or increasing that area, while the defined non-circular shape or geometry of the area remains unchanged. And "continuous" means that the change in area of the aperture may be made while the shape of the aperture remains essentially constant or fixed (except when the aperture is closed).

The preferred embodiment uses two L-shaped blades. The term L-shape may be clarified by again referring to FIG. 10. The metal blade 19 contains straight edges AB and BC that form a front edge to the blade. Those edges are straight and are oriented in directions that are at right angles to one another. The edges of those lines are joined at a right angle ABC at inner corner B of the blade. The blade also contains a rear edge formed by two straight sides or edges DE and EF. Those straight sides extend in different directions, essentially perpendicular to one another, and join at outer or rear corner E at a right angle DEF. Measuring DEF from the same direction as ABC one measures the outer corner at 270 degrees. Side DE is parallel to side BC and side EF is parallel to side AB. The depth of blade 19 is represented by the right and left side edges FA and CD, which edges are parallel. One may note that the surface area ABCDEFA of the both blades 17 and 19 is sufficient in size to block any exposed portion of the underlying central aperture 13 defined in the base plate 3 (see FIG. 1) at the smallest possible aperture for which the combination is being designed, such as shown in FIG. 7B. The C-blades in FIG. 7B are included to round the corners of the square and essentially overlie portions of the surfaces of blades 17 and 19.

As one appreciates, the right angle is not considered mandatory, but discretionary. In a sense, the L-shape is selected for simplicity. However, as those skilled in the art should recognize, the blades need not be precisely L-shape, but may have sides that join at an angle that is other than a right angle, such as may produce a wide V-like shape. In that embodiment the aperture may be formed in a polygonal shape, but not be rectangular. Given the invention many alternatives are possible. Generically, therefor, one might say that the blade contains two legs (or straight edges) joined at an angle, without specifying the size of that angle or requiring that the angle be ninety degrees.

As one also appreciates, if one does not desire to round the edges of the square shaped aperture, then one may eliminate the C-blades, leaving only blades 17 and 19 which alone may be used to define a rectangular shaped aperture. That provides a simpler and less expensive structure. Rounding the corners is a preference (e.g., the aperture is generally rectangular), while an aperture that is literally rectangular has the same utility in the same application.

One is able to discard the curved blades used in the preferred embodiment and employ just the two L-shaped blades (or, more generically speaking, in other embodiments earlier described, two blades each formed with two straight edges joined together at an angle), the actuator plate and the base plate to provide the adjustable rectangular aperture. That rectangular aperture may be varied by rotation of the actuator plate to any position between a maximum and a minimum. In that embodiment, one may not quite form a racetrack aperture, but simply a rectangular aperture. Or if one rounds the corner of the blades, the rectangular aperture will contain two rounded corners. In still other applications, the minimum size, as earlier described, may be zero, if the two blades are arranged to fully overlap and thereby completely close the aperture. That defines a shutter that is able to block all infrared radiation. A cold shutter when fully closed may have an application for calibrating the infra-red camera and also for blocking hostile incoming laser beams that could blind or even damage the infrared sensor in the camera.

In the foregoing description of the blades that form the variable aperture, both L-shaped and curved, is that the blades are formed of metal and are thin. The total thickness of the blades when placed in an overlapping relationship in the variable aperture should also be characterized as relatively thin. Thinness avoids degrading the image as formed in the camera at the surface of the infra-red sensor, either by reducing the intensity of the available light in the received image, darkening the image or by permitting the image to become vignetted. An appropriate thickness for the blades can be empirically determined from the optical design and the tolerances of the optical assembly. In the present the belief is that the total thickness should be less than 0.010 inches. The individual blades can be made as thin as the metal will permit without degrading the structural integrity of the blade. That minimum thickness also may be empirically determined for any metal selected to form the blade. In a practical embodiment, suitable aperture blades were formed of the metal stainless steel in a thickness of 0.002 inches, while thicknesses of 0.001 inch to 0.003 inch are believed acceptable.

As recalled, the variable aperture (or cold stop) is located at the plane of the exit aperture or pupil of the optics of the infra-red camera. From that exit aperture the received image propagates to the infra-red sensor of the camera. FIGS. 2B and 2C of my pending U.S. patent application, publication no. US 2006025275, shows the plane of the exit aperture of the optics and illustrates that moving the plane of that aperture from the correct position illustrated in FIG. 2B, either slightly above or, as illustrated in FIG. 2C, slightly below that plane, degrades the detected image. In the first, some of the peripheral portion of the light from the image is reflected off the front of the rim of the cold stop and lost. In the second case vignetting of the detected image occurs. Increasing the thickness of the overlapping aperture blades above the designated exit aperture cuts some of the incoming light about the periphery of the image, darkening, hence, degrading the image somewhat. In the second if the thickness of the overlapping aperture blades is increased to the opposite side of the plane, the aperture will permit entry of some stray light about the periphery of the image, an adverse effect called vignetting.

The foregoing action is pictorially illustrated in the side section view of the aperture of an infra-red camera presented in FIG. 11 to which reference is made. In this the image I1 from a distant field of view passes through a converging lens L1 and through planar lens L2 toward the formed aperture A1 formed in radiation shield SH, coaxial of the optical axis of the camera lens, and properly positioned along the optical axis to permit entry of the available light inside the radiation shield where that radiation is focused onto the planar infra-red sensor S1 of the camera. As the aperture opens or closes, the aperture remains concentric with the optical axis of the lens. Any stray light, ST1, that enters the camera around the outer edge of the aperture misses that infra-red sensor.

If then the aperture is built up in thickness due to overly thick aperture blades of the variable aperture to the front of the proper aperture plane at which A1 is located, such as represented by the dash lines A2, some of the peripheral portion of the image is incident on the rim of the aperture A2 and is reflected, ST2, or absorbed, and is lost, reducing the light available at sensor S1. If, instead, the aperture is built up in thickness due to overly thick aperture blades of the variable aperture to the rear of the proper aperture plane at which A1 is located, such as represented by the dash lines A3, the aperture then allows stray light ST3 to enter and impinge on the border areas of the infra-red sensor S1. Effectively, thus, the thickness of the overlapping aperture blades and the location of that thickness has the same type of degrading effect as physically moving the position of the aperture.

The thickness of the individual blades and in total should be as thin as physically possible and should not be great enough to produce a visibly degrading effect on the image. And that degradation is a matter of degree. One can accept some amount of degradation, preferably, that which does not produce a noticeable visible effect to the user. An infinite thinness to a blade thickness is impossible and everything else must be a reasonable compromise.

The term circular as used in the claims which follow should be understood as having a greater meaning than the mathematical definition of a circle. The term embraces an aperture that may be an imperfect circle, such as a pentagon or a hexagon or other convex polygon with equal length sides. Those aperture shapes occur when forming the variable aperture with only a few blades because the resolution obtained therewith is not very fine. With a greater number of blades to form the shutter and with slightly curved edges to the blades, the circular shape of the variable aperture improves forming heptagon, octagon, etc., with more rounded corners and more nearly producing a perfect circle. As those skilled in the art recognize, in practice in the present environment it is not possible to form a variable aperture that produces an aperture that is a perfect circle. The foregoing interpretation should be borne in mind when considering the contrary term, non-circular, which, in addition to the shapes cited previously in paragraph 60, thus includes in meaning non-heptagon, non-octagon, and so on.

With an understanding of the foregoing embodiments, one may recognize that it is also possible to control the aspect ratio and size of the continuously variable aperture. The conception is of a variable aperture formed by two sets of blades, that is, two pairs of blades, 50a and 50b and 50c and 50d, respectively such as pictorially illustrated in FIG. 12. To do so, requires separate control of each pair of blades, horizontal and vertical, as represented by the bilateral arrows in the drawing figure. The blades within a given pair of blades are moved in synchronism so that the aperture always remains centered on the optical axis. The foregoing combination may be modified to incorporate the C-blades earlier referred to for the purpose of rounding the sharp corners of the aperture.

One practical embodiment of the foregoing extension of the invention uses two pairs of T-shaped blades. Reference is made to FIGS. 13a-13c and FIGS. 14a-14c which illustrate two sizes of T-shaped blades in top, side and isometric views, respectively. One set includes two T-blades of identical structure to blade 56; the other set contains two T-blades identical in structure to blade 57. T-blade 56 includes the cylindrical pin 58 attached to and projecting from the upper surface of the blade for connection to a slot in an actuator plate, illustrated in FIG. 15, later discussed, and a pair of spaced pins 62 and 64 attached to the underside of that blade for insertion into the appropriate guide slot in the actuator plate, also illustrated in FIG. 15. The second T-blade of the foregoing pair is illustrated as blade 65 in FIG. 15.

T-blade 57 includes the cylindrical pin 59 attached to and projecting from the upper surface of the blade for connection to a slot in an actuator plate, illustrated in FIG. 15, later discussed, and a pair of spaced pins 61 and 63 attached to the underside of that blade for insertion into the appropriate guide slot in the actuator plate, also illustrated in FIG. 15. The second T-blade of the latter pair of T-blades is illustrated as 66 in FIG. 15.

Figure 15:
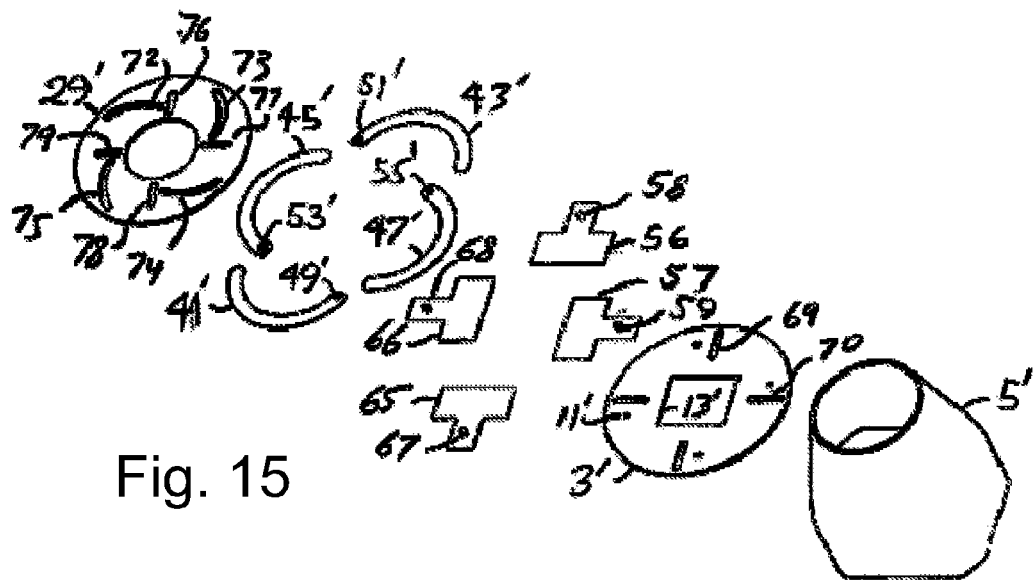
FIG. 15 is an exploded view of a continuous variable aperture assembly that incorporates the T-shaped blades of FIGS. 13 and 14.

Reference is next made to FIG. 15 that illustrates a continuously variable aperture of the extended invention in exploded view. It is noted that the elements in this embodiment that are identical to corresponding elements that were previously denominated by a specific number in the embodiment of FIG. 1 are identified by the same number if present in this embodiment, but in which the number is primed. This embodiment includes radiation shield 5', base or pivot plate 3', actuator plate 29', and T-blades 56, 58, 65 and 66 that incorporates the blades of FIGS. 13 and 14. This embodiment also includes C-blades 41', 43', 45' and 47'.

Although the size and shape of the base plate 3' and rectangular aperture 13' are by design the same as in the base plate of the prior embodiment, the slots are different and are oriented differently relative to the sides of aperture 13'. Instead of two straight slots formed parallel to the diagonal of the central aperture, in this embodiment there are four straight slots 69 and 70, only two of which are labeled. Each of the four slots is oriented perpendicular to the adjacent side of rectangular aperture 13'. The slots are sufficient in width to receive the two pins on the underside of an associated one of the T-blades. Specifically, the two pins 62 and 64 shown in FIG. 13c that are located on the underside of T-blade 56 fit inside straight slot 69 with sufficient clearance to permit the T-blade to be moved along the slot with little or no frictional resistance. The two pins 61 and 63 located on the underside T-blade 57 fit inside straight slot 70 with sufficient clearance to permit the T-blade to be moved along the slot with little or no frictional resistance. Likewise the pins on the underside of T-blades 66 and 67 are respectively fit within the straight slot that is located diametrically opposite to slot 70 and in the slot that is located diametrically opposite to slot 69, The cap or bar situated at the end of the stem of each T-shaped blade is positioned closest to the aperture than the associated stem. More specifically the T-blades are positioned so that the straight edge of the major end of the bar at least faces the aperture or in alternate embodiments overlies an adjacent portion of the aperture when the aperture is intended to be "wide open."

Consider first an embodiment of the continuous variable aperture formed with the elements of FIG. 15, but without the inclusion of the curved C-blades that round the corners. As assembled blades 66 and 57 are seated in the respective slots 70 and its diametrically opposed slot with the bar of the "T" facing aperture 13' with the underlying depending pins positioned in the respective slots. Then blades 58 and 65 are dropped into place in the respective slots in the pivot plate 3', slot 60 and its diametrically opposed slot, also with the underlying depending pins position in the respective slots. The bar portion of the blade is closest to the aperture than the associated stem and that bar overlies at least a portion of the bars of the adjoining T-blades, 57 and 66, with the T-blade withdrawn to the full open aperture position. The T-blades are thin blades as elsewhere herein defined and the combined thickness of the overlapping blades (or portions thereof) is also regarded as thin.

In this embodiment rotation of actuator plate 29' is used to adjust the size of the aperture. That requires the actuator plate to be rotationally mounted in the camera by means not illustrated in this figure. The actuator contains four curved slots 72, 73, 74 and 75 that are evenly distributed and symmetrically positioned about the surface of the plate. The actuator plate also contains four straight radially directed slots of equal length 76, 77, 78 and 79, evenly distributed about the surface of the disk, which are to control the positioning of the curved C-blades. Discussion of the function of those straight slots is temporarily postponed to a later location in this specification.

The actuator is placed over the T-blades so that the projecting pins on the stem of the T-blades fit inside a respective one of the curved slots. Pin 58 fits in curved slot 72, pin 59 in curved slot 73, pin 67 in curve slot 74, and pin 68 in curved slot 75. With the aperture manually placed at the designed wide open position, the pins should be located at the end position that is at the end of the curved slot that is farthest from the center of the central circular opening (or optical axis) in the actuator plate. Rotating the actuator as shown in FIG. 15 counter-clockwise causes the slots to force the respective pins radially inwardly toward the center, narrowing or closing the aperture. Rotating that actuator clockwise forces the pins to back off, that is, move radially outward, hence moving the bar of the respective T-blades to withdraw from positions covering the aperture. Because of the symmetry in structure, the blades in each of the two pairs of T-blades by design are to move equal distances upon any rotation of the actuator plate. In that way the aperture remains centered on the optical axis of the assembly (and camera).

Figure 16:
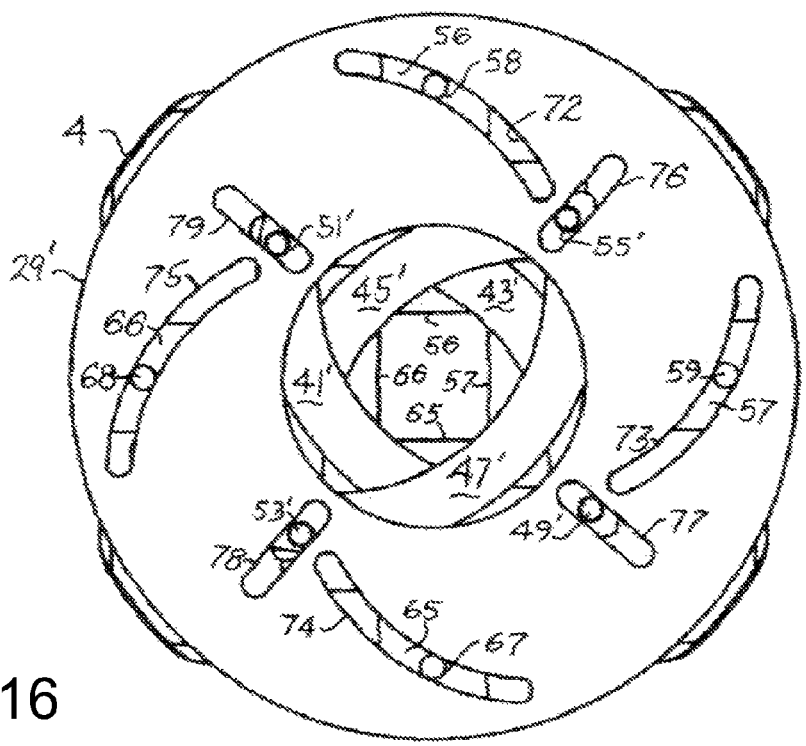
FIG. 16 is the continuous variable aperture assembly of FIG. 15 shown in a side view with the elements assembled.

As viewed from the actuator end with the elements of FIG. 15 assembled together for operation, and including the curved C-blades, the continuous variable aperture appears as illustrated in FIG. 16, which is drawn in a larger scale. The embodiment that is initially considered forms a rectangular variable shutter using only the T-blades 56, 57, 65 and 66, and omits the C-blades that form the rectangle into the racetrack shape. However, to minimize the number of figures in the drawings, the C-blades are included in FIG. 16. Thus, temporarily, the reader is requested to visually omit the C-blades in considering the embodiment. Continuing, the central rectangular aperture, specifically a square opening, is formed with the four intersecting straight sides of the T-blades. The guide pins on the upper surface of associated with those T-blades are shown inside the respective curved slots. For the upper and lower T-blades in the figure, 56 and 65, pin 58 is respectively located in curved slot 73, and pin 67 is located in curved slot 74. For the left and right T-blades, 66 and 57, respectively, pin 68 is positioned in curved slot 75, and pin 59 is located in curved slot 74. It may be noted that the four bulges 4, only one of which is numbered, is a protruding side of the radiation shield 5. That bulge is better illustrated in the side view of FIG. 2.

When actuator plate 29' is rotated counter-clockwise in the figure, pins 58 and 67 are pushed by the slot, moved, radially inwardly, bringing the edges of T-blades 56 and 65 closer together. Because the actuator plate controls both sets of T-blades concurrently, the respective pins 68 and 59 on the left and right side of the figure are also moved radially inwardly by the sides of the respective slots and move the straight edges of T-blades 66 and 57 closer together. When the actuator is rotated clockwise, the reverse occurs. At the most radially outward position along the curved slot, the rectangular aperture attains the greatest size opening. Although not visible, the right and left blades overlap the upper and lower blades, such as was earlier pictorially illustrated in the general embodiment of FIG. 12. As is apparent from the length of the slots and their symmetry in the actuator the movement of the opposing blades in each pair is equal so that the center of the aperture remains fixed on the optical axis. And, as in the prior embodiments, the overall thickness of the blades in total is thin so as not to significantly shift the location of the cold stop when installed in a camera. The foregoing aperture assembly at this point in the description employs the four T-blades to produce a complete shutter. The contribution of the C-Blades is considered as the next embodiment.

The foregoing described a continuous variable rectangular aperture. As in the initial embodiment of the aperture invention one may desire to round the corners of the rectangle to form a "racetrack" shaped aperture, and that is accomplished by the inclusion of the curved C-blades. C-Blades 41', 43', 45' and 47' function just as the corresponding blades in then embodiment of FIG. 1. Those blades are assembled to the anchor plate 3' after the T-blades have been installed.

Each curved blade contains a pivot pin on the end of the blade opposite the end that contains the pin on the upper surface that is visible in FIG. 15. That anchor pin is not illustrated in this view, but a like pin 57 in the original embodiment is shown in FIGS. 5A and 5B. The base or pivot plate 3' contains four small pivot holes 11', only one of which is numbered, each being located to one side of the four straight slots, 69, 70. The pivot pin of a C-blade is inserted into a pivot hole on the pivot plate. Each of the remaining C-blades is similarly coupled to a respective one of the four pivot holes on the anchor plate in a round-robin fashion. It is seen that the width of the stems on the T-blades as installed in the respective straight guide slots, such as 69, 70, in the anchor plate are sufficiently narrow so as to leave the adjacent pivot hole uncovered and accessible to the pivot pin of a C-Blade.

However, in this embodiment the pins 51', 53', 49' and 55' on the upper surface of those C-blades are received in and are guided by straight slots 79, 78, 77 and 76 in actuator plate 29'. As one can appreciate, as the actuator plate rotates counter-clockwise to reduce the size of (or close) the formed aperture, the straight slots force the pins of the C-blade located therein to move radially inward, pivoting the end of the C-blades around to maintain a position over a respective right angle corner of the rectangular aperture, maintaining a rounded corner. Conversely, as the anchor plate is rotated clockwise to open further or widen the formed rectangular aperture, the pins in the straight slots are moved sideways to force the associated blade to pivot in the opposite direction. As so pivoting the pin moves up the slot. Thus as the aperture enlarges, the curved C-blades widen to maintain a position overlying the respective corners of the rectangle, effectively maintaining a racetrack shaped aperture. As one appreciates the foregoing is continuous with every increment of rotation of the actuator plate in either direction and the size of the aperture is variable.

Although the foregoing invention was conceived and developed for a perceived application in infra-red cameras, principally FLIR systems, it is possible that forms of the foregoing embodiments might find application in other kinds of systems. The present invention thus should not be regarded as limited to infra red systems.

It is believed that the foregoing description of the preferred embodiments of the invention is sufficient in detail to enable those skilled in the art to make and use the invention without undue experimentation. However, it is expressly understood that the details of the elements comprising the embodiment presented for the foregoing purpose is not intended to limit the scope of the invention in any way in as much as equivalents to those elements and other modifications thereof, all of which come within the scope of the invention, will become apparent to those skilled in the art upon reading this specification. Thus the invention is to be broadly construed within the full scope of any claims that may be appended hereto.

What is claimed is:

1. A continuous variable aperture for an infra-red camera, comprising:

a pair of positionable blade members for defining an aperture, said aperture being of an area that is selectively adjustable in size and, when said aperture is open, is of a generally rectangular shape, the size of said area being a function of the position of said positionable blade members relative to one another; and an actuator for selectively positioning said positionable blade members relative to one another to any position within a continuum of positions to selectively adjust said area of said adjustable aperture, wherein said generally rectangular shape of said aperture further comprises a rectangle to define a rectangular aperture; and further comprising:

a plurality of additional positionable curved blade members for rounding the corners of said rectangular aperture, irrespective of the size of said aperture, to produce a generally race track shaped aperture, said additional positionable curved blade members including a curved edge; and wherein said actuator controls positioning said plurality of additional curved blade members concurrently in synchronism with the positioning of said pair of positionable blade members.

2. The continuous variable aperture for an infra-red camera as defined in claim 1, wherein said generally rectangular shape comprises a square.

3. The continuous variable aperture for an infra-red camera as defined in claim 1, wherein said generally rectangular shape comprises a rectangle in which at least two of the corners of said rectangle are rounded.

4. The continuous variable aperture for an infra-red camera as defined in claim 3, wherein said pair of positionable blade members comprise:

a pair of flat metal blades, each of said flat metal blades of said pair including two legs joined at an angle and defining an inner corner;

said flat metal blades being positioned with the inner corner of each metal blade oriented facing the inner corner of the other blade in a confronting relationship and the two legs of each metal blade overlapping the other of said metal blades, said inner corner of said metal blades being positionable to various degrees of separation relative to one another along a straight line to define an aperture in between that is adjustable in size and of a generally rectangular geometry, the size of said aperture being a function of the proximity of said inner corners of said flat metal blades.

5. The continuous variable aperture for an infra-red camera as defined in claim 1, wherein one of said blade members is in an overlapping relationship with the other one of said blade members.

6. The continuous variable aperture for an infra-red camera as defined in claim 1 wherein each of said blade members is configured to have a predefined position so that said blade members produce a closed aperture when positioned at respective predefined positions, whereby said variable aperture also functions as a shutter.

7. The continuous variable aperture for an infra-red camera as defined in claim 1, wherein said actuator for selectively positioning said positionable blade members relative to one another is limited to two positions within said continuum of positions to selectively adjust said area of said adjustable aperture between only two values and thereby emulate a discontinuous aperture.

8. The continuous aperture for an infra-red camera as defined in claim 1, wherein said blade members comprise L-shaped blades.

9. The continuous aperture for an infra-red camera as defined in claim 1, further comprising a second pair of blade members and wherein said blade members of both said pairs comprise T-shaped blades.

10. The continuous variable aperture for an infra-red camera as defined in claim 1, wherein said actuator comprises a rotatable actuator, said rotatable actuator for positioning said positionable blade members relative to one another to adjust the size of said defined aperture, said positionable blade members responsive to the angular rotation of said rotary actuator for linearly moving said positionable blade members relative to one another.

11. The continuous variable aperture for an infra-red camera as defined in claim 1, wherein said pair of positionable blade members comprise:

a pair of flat metal blades, each of said flat metal blades of said pair including two legs joined at an angle and defining an inner corner;

said flat metal blades being positioned with the inner corner of each metal blade oriented facing the inner corner of the other metal blade and the two legs of one of said metal blades overlapping the corresponding legs of the other of said blades, said inner corner of said metal blades being positionable to various degrees of separation relative to one another along a straight line to define an aperture in between that is adjustable in size and of a generally rectangular geometry, the size of said aperture being a function of the proximity of said inner corners of said flat metal blades.

12. The continuous variable non-circular aperture for an infra-red camera as defined in claim 11, wherein said pair of flat metal blades comprise a pair of L-shaped-flat metal blades.

13. The continuous variable non-circular aperture for an infra-red camera as defined in claim 11, wherein said flat metal blades each comprise a geometry of L-shape.

14. The continuous variable non-circular aperture for an infra-red camera as defined in claim 11, wherein said flat metal blades each comprise a geometry of a T-shape.

15. The continuous variable aperture for an infra-red camera as defined in claim 1, comprising:

a radiation shield including an opening coupled to the aperture to selectively allow, via operation of the actuator that controls the opening, a portion of infra-red radiation energy at the aperture to reach an infra-red sensor located in the radiation shield while shielding the infra-red sensor from receiving radiation energy other than the portion of infra-red radiation energy selected by the actuator via the aperture.

16. The continuous variable aperture for an infra-red camera as defined in claim 15, comprising:

lenses in front of the aperture that directs incident infra-red radiation to the aperture.

17. The continuous variable aperture for an infra-red camera as defined in claim 15, comprising:

a pivot plate engaged to the radiation shield and including a central opening to allow radiation to pass through, the pivot engaged to the pair of positionable blade members to allow the pair of positionable blade members to move with respect to the pivot plate in controlling the opening of the aperture in connection with the plurality of additional positionable curved blade members; and an aperture plate including a central opening to allow radiation to pass through and engaged to the plurality of additional positionable curved blade members to allow the plurality of additional positionable curved blade members to move with respect to the aperture plate in controlling the opening of the aperture in connection with the pair of positionable blade members.

* * * * *

UNITED STATES PATENT AND TRADEMARK OFFICE
CERTIFICATE OF CORRECTION

| | |
|---|---|
| PATENT NO. | : 8,164,813 B1 |
| APPLICATION NO. | : 12/006428 |
| DATED | : April 24, 2012 |
| INVENTOR(S) | : Nahum Gat and Jingyi Zhang |

Page 1 of 1

It is certified that error appears in the above-identified patent and that said Letters Patent is hereby corrected as shown below:

In Fig. 4c, Sheet 2 of 6, please delete "Fig 4c" and insert -- Fig. 4c --, therefor.

In Column 1, Line 23, please delete "et al" and insert -- et al. --, therefor.

In Column 5, Line 30, please delete "assembled;" and insert -- assembled. --, therefor.

In Column 5, Line 32, please delete "DESCRIPTION" and insert -- DETAILED DESCRIPTION --, therefor.

In Column 8, Line 14, please delete "1)," and insert -- 1). --, therefor.

In Column 9, Line 44, please delete "shield, 5, the pivot plate, 3," and insert -- shield 5, the pivot plate 3, --, therefor.

In Column 9, Line 57, please delete "et at" and insert -- et al. --, therefor.

In Column 19, Line 38, in Claim 6, please delete "claim 1" and insert -- claim 1, --, therefor.

In Column 19, Line 50, in Claim 8, please delete "continuous" and insert -- continuous variable --, therefor.

In Column 19, Line 53, in Claim 9, delete "continuous" and insert -- continuous variable --, therefor.

Signed and Sealed this
Eighteenth Day of September, 2012

David J. Kappos
*Director of the United States Patent and Trademark Office*